United States Patent Office 3,028,219
Patented Apr. 3, 1962

3,028,219
PROCESS FOR REMOVING ACETONE FROM AQUEOUS HYDRAZINE SOLUTIONS CONTAINING ACETONE
Erich Rahlfs, Leverkusen-Bayerwerk, and Günter Henrich, Opladen, Germany, assignors to Farbenfabriken Bayer Aktiengesellschaft, Leverkusen, Germany, a corporation of Germany
No Drawing. Filed July 28, 1958, Ser. No. 751,174
Claims priority, application Germany Aug. 1, 1957
2 Claims. (Cl. 23—190)

The present invention relates to a process for removing acetone from aqueous hydrazine solutions containing acetone.

As is known, it is possible to separate hydrazine hydrate by distillation in the presence of acetone from dilute aqueous solutions such as are formed for example in the Raschig synthesis. An aqueous solution of hydrazine with a high acetone content is formed as distillate, the hydrazine in the solution obviously being present as a hydrazine-acetone compound, probably substantially in the form of dimethyl ketazine.

Hydrazine salts can be recovered from this solution by decomposition with acid. Since processes exist for recovering hydrazine hydrate from hydrazine salts, a method is thus provided for the production of hydrazine hydrate. It is however disadvantageous in this connection that one equivalent of acid and one equivalent of base are each required per equivalent of hydrazine.

The present invention is concerned with a process for removing acetone by distillation from aqueous hydrazine solutions containing acetone, the said process consisting in that the evaporation takes place in stages, the passage of the liquid phase through each stage always being preceded by a holding period in a delay vessel.

In order to obtain the best possible results, the following condition should be maintained:

(1) The water content of the liquid phase must amount to at least 5 mols of water to 1 mol of hydrazine.

(2) From a prescribed quantity of liquid, only a limited amount of vapour must be removed per unit of time, since the acetone is for the major part present in combined form as dimethyl ketazine and must be constantly released in a time reaction with progressive vaporisation in accordance with the chemical equilibrium.

It has proved advisable to carry out the process continuously in an apparatus which consists essentially of a series of separating columns. The liquid discharge of each of these separating columns is conducted into a delay vessel from which the liquid is delivered to the top of the next separating column. From the lowermost separating column, the liquid enters the evaporator from which the evaporated solution is continuously removed.

An intensifier column fed by reflux is preferably arranged above the inlet. In this way, it is possible to keep the hydrazine content in the distillate as low as possible.

If a bubble-plate column with a large charging volume for the separate plates, for example 10–30 litres to 100 kg. of charged vapour, is used as separating column, the individual plates can simultaneously serve the purpose of delay vessels.

The invention is illustrated by the following example without being restricted thereto.

*Example*

In order to illustrate the foregoing process, reference is made to the following examples:

The apparatus consists of 5 separating columns each with a diameter of 38 mm. and a height of 200 mm., and a reflux column of the same size, each separating column being followed by a holding or delay vessel with a content of 200 ml. The lowermost vessel is heated and has a sump discharge. The feed is introduced between the reflux column and the uppermost separating column. 30% of the distillate is refluxed.

(1) With a feed of a concentration of 12% of hydrazine hydrate and 28% of acetone and a distillate fraction of 18% (based on the supply), the concentration of the distillate is 5% of hydrazine hydrate and 86% of acetone. The sump discharge has the composition 13.5% of hydrazine hydrate and 17.0% of acetone.

(2) With a feed of a concentration of 18.5% of hydrazine hydrate and 21.5% of acetone and a distillate fraction of 10%, the concentration of the distillate is 2% of hydrazine hydrate and 67% of acetone and the concentration of the discharge is 16.5% of hydrazine hydrate and 11.6% of acetone.

We claim:

1. Process for removing acetone by distillation from aqueous hydrazine solutions containing a hydrazine-acetone compound, which comprises step-wise in a first stage hydrolyzing a part of the hydrazine-acetone compound present in said aqueous solution by means of the water present, the water being present in an amount of at least about 5 mols per mol of hydrazine present, and in a second stage removing the acetone formed during the first stage by distillation, and thereafter repeating the hydrolizing and distillation steps at least one more time on the liquid discharge of said distillation.

2. Process for removing acetone by distillation from aqueous hydrazine solutions containing a hydrazine-acetone compound, which comprises subjecting said aqueous hydrazine solution containing a hydrazine-acetone compound to successive treatment steps, which consist in a first stage hydrolyzing a part of the hydrazine-acetone compound present in said aqueous solution by means of the water present, the water being present in an amount of at least about 5 mols per mol of hydrazine present, and in a second stage removing the acetone formed during the first stage by distillation and thereafter repeating the hydrolyzing and distillation steps at least one more time on the liquid discharge of said distillation and interrupting said treatment steps with an intermediate holding step interposed for the liberation of an amount of acetone to be distilled off in the subsequent step.

References Cited in the file of this patent
UNITED STATES PATENTS

| | | |
|---|---|---|
| 2,537,791 | Schwarcz | Jan. 9, 1951 |
| 2,698,286 | Bircher | Dec. 28, 1954 |
| 2,733,195 | Miller | Jan. 31, 1956 |

OTHER REFERENCES

Gilbert: "Journal of American Chemical Society," 1929, vol. 51, pp. 3394–3409.

Audrieth: "The Chemistry of Hydrazine," 1951, pp. 43–44